Figure 1:
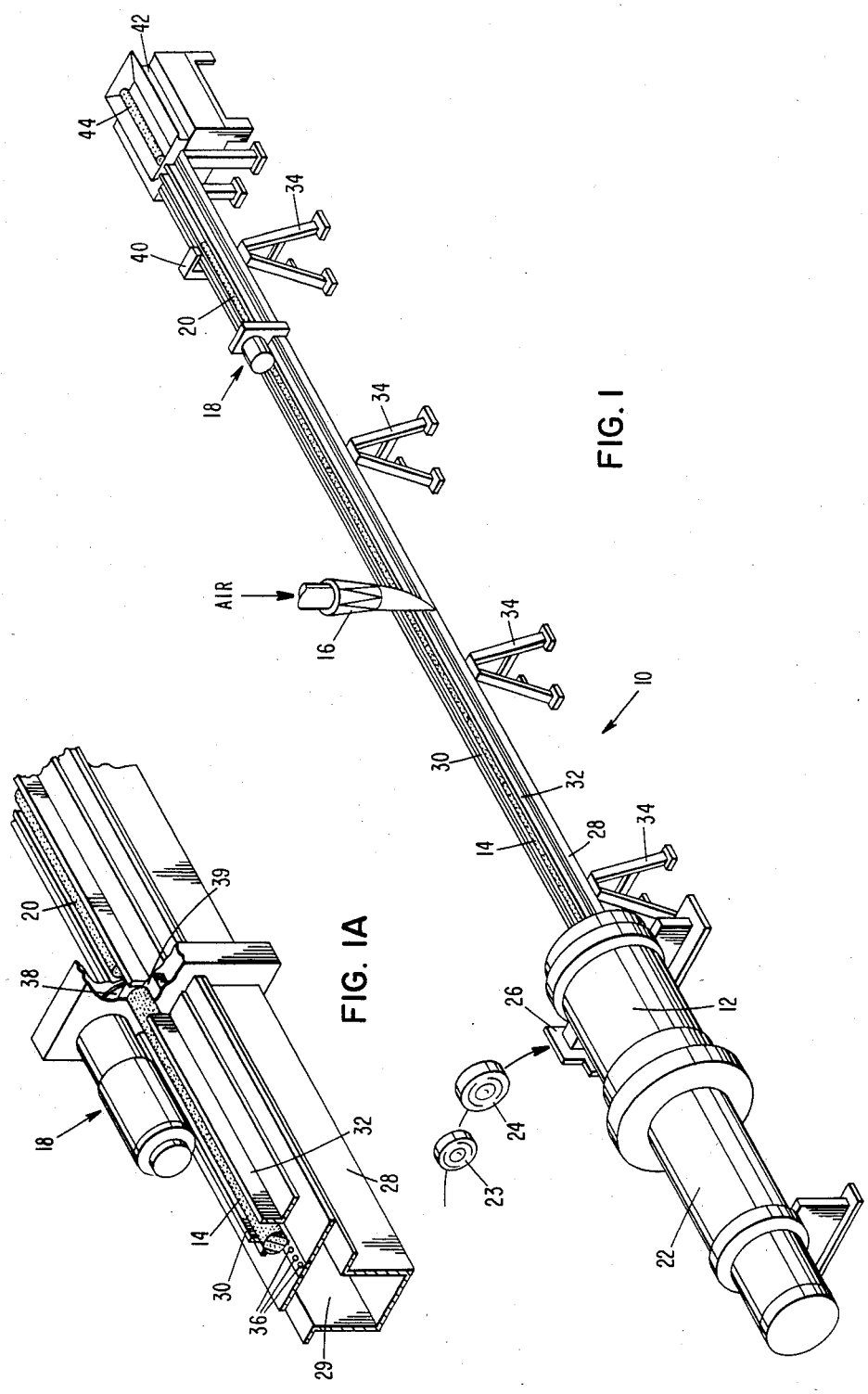

United States Patent [19]

Rollyson et al.

[11] Patent Number: 4,585,600
[45] Date of Patent: Apr. 29, 1986

[54] EXTRUSION, CONVEYANCE, AND CUTTING SYSTEM

[75] Inventors: Richard A. Rollyson, Radford; Peter D. Wesson, Blacksburg; Paul S. Zerwekh, Radford, all of Va.

[73] Assignee: Hercules Incorporated, Wilmington, Del.

[21] Appl. No.: 675,504

[22] Filed: Nov. 28, 1984

[51] Int. Cl.[4] .............................................. C06B 21/00
[52] U.S. Cl. .................................. 264/3.3; 264/3 R; 264/148; 264/159; 83/289; 83/365; 83/369
[58] Field of Search ............... 264/3 R, 3 B, 148, 159; 83/289, 365, 369

[56] References Cited

U.S. PATENT DOCUMENTS

| | | | |
|---|---|---|---|
| 3,114,282 | 12/1963 | Refenhauser et al. | 83/287 |
| 3,527,129 | 9/1970 | Schlesser | 83/203 |
| 3,712,165 | 1/1973 | Meyer | 83/289 |
| 3,717,058 | 2/1973 | McMinn | 83/289 X |
| 4,014,655 | 3/1977 | Brunnberg | 264/3 B X |
| 4,016,790 | 4/1977 | Felix et al. | 83/365 X |

FOREIGN PATENT DOCUMENTS

| | | | |
|---|---|---|---|
| 3041705 | 6/1982 | Fed. Rep. of Germany . | |
| 7409774 | 1/1977 | France . | |
| 1107878 | 3/1968 | United Kingdom | 83/289 |
| 2107638 | 5/1983 | United Kingdom . | |

*Primary Examiner*—Peter A. Nelson
*Attorney, Agent, or Firm*—Edmund C. Ross, Jr.

[57] ABSTRACT

An apparatus 10 that extrudes, conveys and cuts a propellant strand into precise lengths independent of strand velocity is disclosed. Cutting of the strand is accomplished by a cutter 18 having a blade mounted on a shaft which in one revolution cuts the strand. The shaft is activated after passage of the strand end past a pair of downstream optic sensors; compensation is made for cutter delay and strand velocity by having cutting activation take place in the same amount of time as it takes the strand end to pass both sensors less cutter delay.

12 Claims, 5 Drawing Figures

EXTRUSION, CONVEYANCE, AND CUTTING SYSTEM

The U.S. Government has rights in the invention of this application under contract DAAA09-77-C-4007.

This invention relates to manufacture of stick propellant in precise lengths and, more particularly, to a method that accomplishes this manufacture in continuous fashion. This invention, still more particularly, relates to such a method in which stick propellant is cut in precise lengths independent of fluxuations in strand velocity.

Continuous extrusion, conveying and cutting propellant has been demonstrated previously by others. However, these systems utilized an intermediate cutter and were limited to products of granular type propellant since the amount of reject material generated is directly proportional to product length. Still others in Europe have cut solventless propellant sticks of lengths ranging from 13-850 mm utilizing an automatic cut-off technique; however, their system is only suitable for a vertical press where the strand extrusion velocities are are very slow whereby a fast-acting cutter can cut a reasonably accurate length. The instant invention overcomes the constraints of utilizing a vertical press and low strand extrusion velocity.

Automatic cut-off mechanisms are widely employed in plastic manufacture; however, these mechanisms employ either a method of mechanically capturing the extruded material and feeding it to the cut-off mechanism at a known rate or in a known incremental amount, or methods of utilizing feedback to control the extrusion velocity. The instant invention differs from these systems in that the extrusion velocity is permitted to vary and strand deformation associated with mechanical capture of the strand is eliminated. Also, the system of the instant invention has advantages in the inherent safety of using a pneumatic bed for conveyance, a single powered element, a DC motor, for strand cut-off, and non-contact sensing of propellant position.

Still other advantages will be seen from the following disclosure of this invention.

This invention provides for manufacture of stick propellant through use of a ram press or screw extruder, a fluidized bed pneumatic conveyor, and a microprocessor controlled DC (direct current) servo motor cutter. A strand of propellant is continuously conveyed from the extruder or press, the strand is cut into precise lengths and then the cut sticks removed from the cutting area for packing.

More particularly, automated manufacture of stick propellant in precise, substantially equal lengths on a continuous basis is characterized in accordance with this invention by a method comprising (a) shaping a mass of propellant to a continuous strand of the propellant by pushing the mass through a die of an extruder, ram press or the like; (b) pneumatically conveying the strand received from the die lengthwise past (i) a cutter adapted to cut crosswise through the strand perpendicular to the direction the strand is conveyed, the cutter completing cutting of the extruded and conveyed strand upon expiration of a predetermined cutter delay period which commences on cutter activation, (ii) a first sensor that is downstream from the cutter and (iii) a second sensor that is downstream from the first sensor by a distance that is greater than the distance the strand travels during the cutter delay period, and to (iv) a stick transporter that is downstream from the cutter and periodically transports a freshly cut stick of propellant resulting from the cutting by the cutter away from that portion of the strand that follows the freshly cut stick; (c) as the strand is passed by the first and second sensors, A. counting and storing the count of a first amount of equally spaced time pulses ticking between when (i) a forward end of the strand is first sensed by the first sensor and (ii) this forward end is thereafter first sensed by the second sensor, and then B. signaling for the cutter activation at the end of the second amount of the equally spaced time pulses, this second amount of pulses being counted commencing at the end of the first amount of pulses and ending when a third amount of these pulses has elapsed wherein the third amount of the equally spaced time pulses is equal to the first amount stored less the amount of the equally spaced pulses in the cutter delay period. The method of this invention is suitable for use in manufacture of stick propellant from solvent type single, double and triple base propellants as well as solvent less type double and triple base propellants from horizontal as well as vertical presses.

This invention is further described in reference to FIGS. 1, 1A and 2-4.

FIGS. 1 and 1A are simplified views in perspective of apparatus 10 used in practice of this invention. FIG. 1 shows extruder 12 extruding propellant strand 14 that is pneumatically conveyed by introduction of air into inlet 16. FIG. 1A is an expanded view of cutter 18, conveyor 28 and plenum 29 portions.

Figure 2:
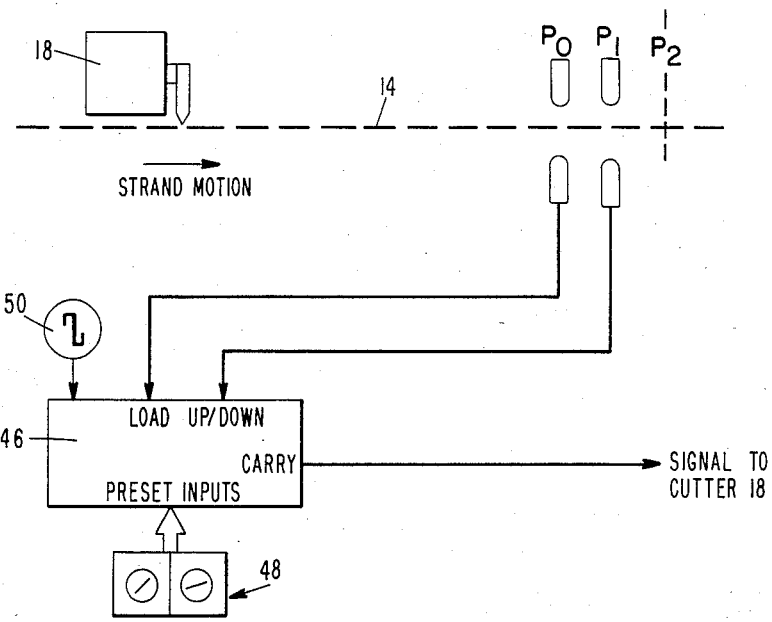

FIG. 2 is a schematic of propellant strand 14, cutter 18 and sensors $P_0$ and $P_1$.

Figure 3:
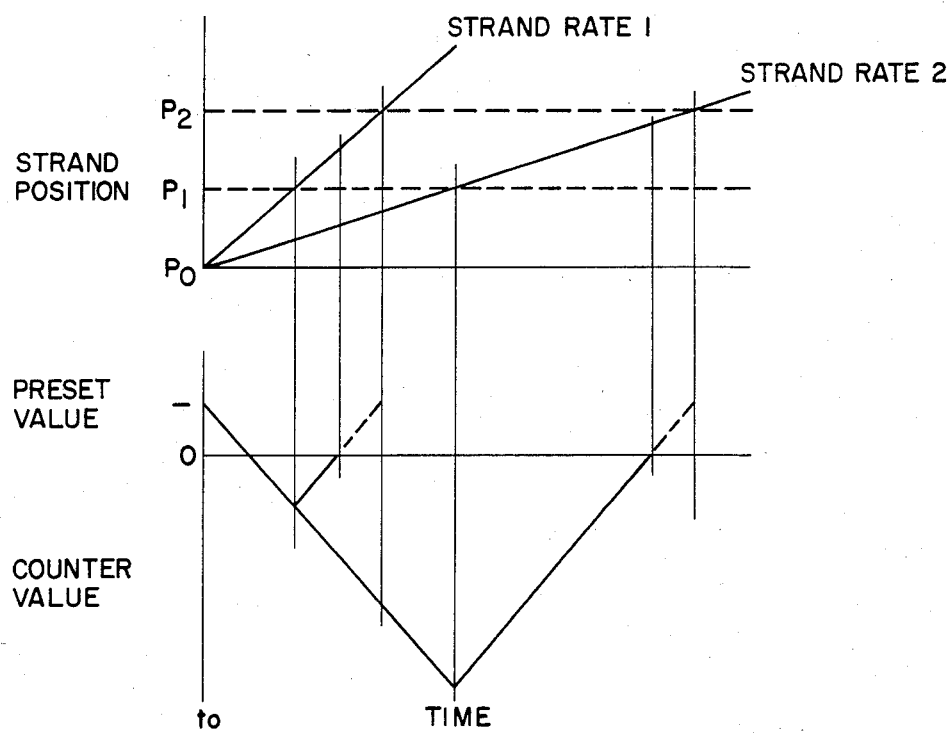

FIG. 3 graphically depicts the relationship between propellant strand position, $P_0$, $P_1$ and $P_2$ and time in two inter related graphs.

Figure 4:
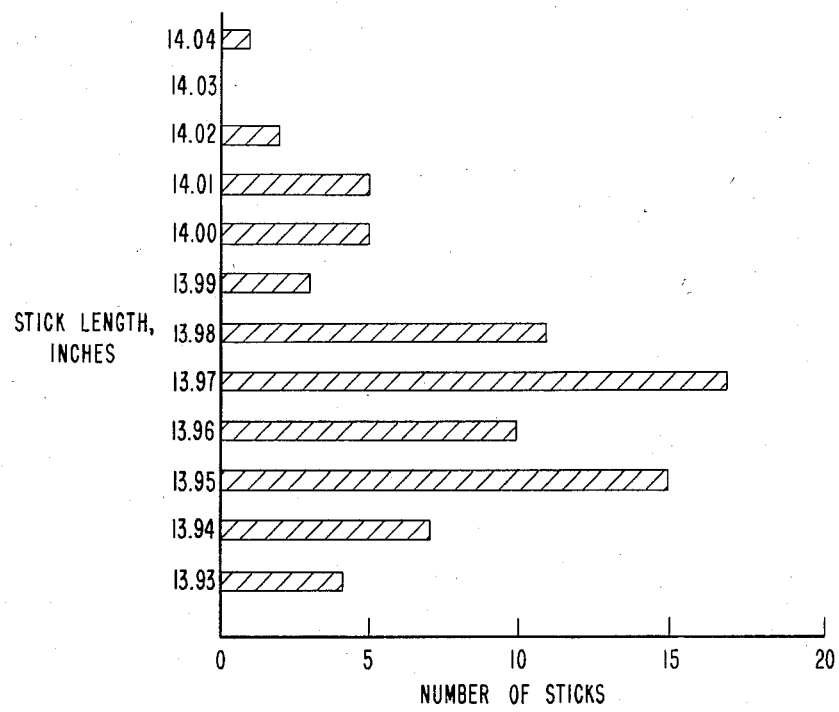

FIG. 4 is a bar graph depicting the precision obtained in a practice of this invention.

Turning to FIG. 1, as previously noted, extruder 12 extrudes propellant strand 14. Extruder 12 has a ram in housing 22 which presses propellant carpet rolls such as 23, 24 received by inlet 26 for extrusion. Propellant strand 14 exits a die orifice (not shown) at the end of extruder 12, travels through a short tube and then onto conveyor 28 between guides 30, 32. Air force through inlet 16 into plenum 29 of the pneumatic conveyor provides a fluidized bed that is direction oriented from plenum 29 to lift and direct propellant strand 14 to cutter 18. The pressure of air in plenum 29 is about 5 inches of water above atmosphere. In addition, air of the JETSTREAM ® pneumatic conveyor (available from Jetstream Systems Company) cools the propellant strand 14 as the air exits jet orifices 36 (see FIG. 1A) which are dispersed throughout the length of conveyor 28.

Cutter 18 has blade 38 that is designed to cut through the propellant strand 14. Blade 38 is mounted on the shaft of the DC servo motor cutter 18 and a single rotation of the motor constitutes the cutting action. The motor for cutter 18 is available from Inland Motors Company as model TTR-2042-3010 with amplifier SM6015-22. The amplifier amplifies the signal from a MM-10 microprocessor. The motor of cutter 18 is controlled by the MM-10 microprocessor (available from Industrial Indexing Systems Company) which is programmed to drive the motor through one revolution with prescribed acceleration, maximum velocity and deceleration rates. Also, angular velocity (tachometer) and position (2-pole resolver) feedback to the MM-10 microprocessor provide data for insuring the single revolution of blade 38 is repeatable. If actual travel of blade 38 deviates excessively from the prescribed path, then power is interrupted. This interruption prevents the occurrence of motor overheating due to motor stall such as when blade 38 strikes anvil 39 or metal object. Moreover, the anvils (only one shown as 39) of cutter 18 are fabricated from energy absorbing materials so that should blade 18 impact an anvil, it will not cause propellant initiation. The pair of anvils contact propellant strand 14 during its passage by cutter 18.

The sensing elements at $P_0$ and $P_1$ (see FIG. 2) are carried by sensor housing and support 40 (FIG. 1) and utilize non-contacting optics so that propellant strand position is detected without the possibility of product deformation. Non-contacting optics advantageous from a safety standpoint.

The sensors are employed so that strand velocity just prior to the cut is measured (computed) electronically, and the cutter motor action activated in accordance to strand velocity. This arrangement achieves the cutting of sticks of constant length. Fiber optic sensors provide an inexpensive, intrinsically safe method of detecting the leading edge of the propellant strand.

The output of sensors at $P_0$, $P_1$ is used to select various modes of operation of a Binary Codes Decimal (BCD) counter 46. FIGS. 2 and 3 illustrate how this system compensates for strand rate variation and the symbols in these Figures have meanings set forth in Table I below:

TABLE I

| | |
|---|---|
| $P_0$ = | Position of first sensor |
| $P_1$ = | Position of second sensor |
| $P_2$ = | Desired strand length from cutter, and |
| $t_0$ = | Time until the propellant reaches $P_0$ |

When no propellant is present, the counter 46 is held in the load mode, the output being held at the preset value, set by the binary rotary switches 48. This value corresponds to the inherent cutter delay (e.g., about 55 milliseconds). When the propellant reaches $P_0$, the load input is deactivated and the counter begins to count pulses from the precision oscillator 50. It counts down from the preset value, becoming more negative in value until the propellant reaches $P_1$. At this point the count direction is reversed and the counter value begins to increase toward zero. When the count value reaches zero, a pulse is sent out to the cutter by a time period equal to the cutter delay in advance of the propellant reaching $P_2$. The cutter blade cuts the propellant strand 14 when its leading edge reaches $P_2$ regardless of the extrusion velocity. Sensors $P_0$ and $P_1$ are typically about 1.25–2.0 cm apart along the conveyor track.

Through use of the precision oscillator 50 and digital circuitry 46, 48, this system provides the necessary strand rate to cutter delay synchronization without the need for complex adjustment.

After propellant stick such as stick 20 in FIG. 1 is cut, a transporter carries this stick 20 and subsequently cut sticks away from cutter 18. As shown in FIG. 1, propellant sticks can be pneumatically conveyed after cutting and deposited in a bin 42. Preferably, this transportor is the same pneumatic conveyor as used in pneumatic conveyance of strand 14 prior to cutting. In this embodiment, plenum 29 simply extends the length of device 10. The cut sticks are accelerated away from the strand 14 by such pneumatic conveyance. With solventless propellants, the cut sticks such as 44 are cooled sufficiently by the pneumatic conveyance so that they may be simply dropped into bin 42. Solvent propellants, however, may need special handling after they are cut into propellant sticks. A conveyor belt may be used, alternatively, to carry sticks from cutter 18.

FIG. 4 shows the results of utilizing a propellant stick manufacturing procedure such as described above. The 80 sticks in FIG. 4 are nominally 14" sticks with a standard deviation of between 0.020 and 0.023 inches and a mean length of 13.969 inches. The stick has a diameter of about 0.248 inches and comprises by weight about 62.5% nitrocellulose, 36.7% diethgleneglycoldinitrate, 0.45% Akardite II, 0.25% Ethyl Centralite and 0.10% of graphite and magnesium oxide.

The automated stick propellant manufacturing apparatus of FIG. 1 as described above may be scaled such that the die has many orifices through which a plurality of strands are extruded and laid in individual trays of a multiple track pneumatic conveyor. One or more air inlets may be used for the fluidized bed pneumatic conveyance. Also, each track preferably has a separate cutter and optical sensor combination. The strand rate ranges, for example, between about 120 and 360 mm per second.

What is claimed is:

1. A method for automated manufacture of stick propellant, said stick propellant having precise selected lengths that are substantially equal each other and constant, said method comprising:
   (a) shaping a mass of propellant into a continuous strand of said propellant by pushing said mass through a die;
   (b) pneumatically conveying said strand received from said die past (i) a cutter adapted to cut crosswise through said strand penpendicular to the direction said strand travels, said cutter completing the cutting through said strand upon expiration of a predetermined cutter delay period that commences on cutter activation, (ii) a first sensor that is downstream from said cutter and (iii) a second sensor that is downstream from said first sensor by a distance that is greater than the distance said strand travels during said cutter delay period and to (iv) a stick transporter that is downstream from said cutter and transports a freshly cut stick of propellant resulting from cutting by said cutter away from that portion of said strand that follows said freshly cut stick;
   (c) as said strand is passed by said first and second sensors,
      (A) counting and storing the count of a first amount of equally spaced time pulses, said first amount being defined as the amount of said equally spaced time pulses between (i) the time when a forward end of said strand is sensed by said first sensor and (ii) the time when said forward end is first sensed by said second sensor, then
      (B) signaling for said cutter activation at the end of a second amount of said equally spaced time pulses, said second amount being defined as the amount of said equally spaced time pulses between (i) the time when said first amount ends and (ii) the time when a third amount of said equally spaced time pulses ends where said third amount is defined as the number of said equally spaced time pulses in said first amount less the number of said equally spaced time pulses in said cutter delay period.

2. The method in accordance with claim 1, wherein said pneumatic conveyance from said die comprises an opened fluidized bed that passes air underneath said strand for lift and direction thereof to said cutter.

3. The method in accordance with claim 2, wherein said cutter comprises a blade mounted on a rotating shaft.

4. The method in accordance with claim 1, wherein said propellant is selected from the group consisting of solvent type and solventless type propellants.

5. The method in accordance with claim 4, wherein said sensors are optic sensors.

6. The method in accordance with claim 5, wherein said stick transporter conveys said freshly cut sticks pneumatically in an open trough wherein air pressure provides direction and lift.

7. A method for automated manufacture of stick propellant, said stick propellant being made in sets of precise lengths where the length in a first set may selectively be equal to the length in a second set, said method comprising:

(a) shaping a mass of propellant into a plurality of strands of said propellant by pushing said mass through a die with a plurality of orifices;

(b) pneumatically conveying said strands received from said orifices in separate tracks using air from an inlet past, in case of a first of said strands, (i) a first cutter in a first of said tracks, said first cutter adapted to cut crosswise through said first strand perpendicular to the direction of said first strand is conveyed, said first cutter completing cutting through said strand upon expiration of a predetermined first cutter delay period that commences on a cutter activation for said first cutter, (ii) a first strand first sensor that is adjacent said first track and downstream from said first cutter, and (iii) a first strand second sensor that is adjacent said first track and downstream from said first strand first sensor by a distance that is greater than the distance said first strand travels during said cutter delay period and to (i) a stick transporter that is in said first track and downstream from said first cutter and transports freshly cut first sticks of said propellant resulting from cutting said first strand by said first cutter sequentially away from that portion of said first strand that respectively follows said freshly cut first sticks; and in case of a second of said sticks, (i) a second cutter in a second track, said second cutter adapted to cut crosswise through said second strand perpendicular to the direction said second is conveyed along said second track, said second cutter completing cutting through said second strand upon expiration of a second predetermined cutter delay period that commences on cutter activation for said second cutter; (ii) a second strand first sensor that is adjacent said second track downstream from said second cutter and (iii) a second strand second sensor that is adjacent said second track downstream from said second strand first sensor and to (iv) a transporter that is in said second track and downstream from said second cutter and transports freshly cut second stick of propellant resulting from cutting said second strand by said cutter sequentially away from that portion of said second strand that respectively follows said freshly cut first sticks;

(c) as said first strand is passed by said first strand first and second sensors,
   (A) counting and storing the count of a first amount of equally spaced time pulses, said first amount being defined as the amount of said equally spaced time pulses between (i) the time when a forward end of said first strand is first sensed by said first strand first sensor and (ii) the time when said forward end of said first strand is first sensed by said first strand second sensor, then
   (B) signaling for said first cutter activation at the end of a second amount of said equally spaced time pulses, said second amount being defined as the amount of said equally spaced time pulses between (i) the time when said first amount ends and (ii) the time when a third amount of said equally spaced time pulses ends where said third amount is defined as the number of said equally spaced time pulses in said first amount less the number of said equally spaced time pulses in said first cutter delay period;

(d) as said second strand is passed by said second strand first and second sensors,
   (A) counting and storing the amount of a second strand first amount of equally spaced time pulses, said second strand first amount being defined as the amount of said equally spaced time pulses between (i) the time when a forward end of said second strand is first sensed by said second strand first sensor and (ii) the time when said forward end of said second strand is first sensed by said second strand second sensor, then
   (B) signaling for said second cutter activation at the end of a second strand second amount of equally spaced time pulses, said second strand second amount being defined as the amount of said equally spaced time pulses between (i) the time when said second strand first amount ends and (ii) the time when a second strand third amount of said equally spaced timed pulses ends where said second strand third amount is defined as the number of said equally spaced time pulses in said second strand first amount less the number of said equally spaced time pulses in said second cutter delay period.

8. A method for automated manufacture of tubes of extruded material, said tubes having precise lengths that are substantially equal each other and constant, said method comprising:

(a) shaping a mass of extruder material into a continuous strand of said material by pushing said mass through a die;

(b) pneumatically conveying said strand received from said die past (i) a cutter adapted to cut crosswise through said strand penpendicular to the direction said strand travels, said cutter completing the cutting through said strand upon expiration of a predetermined cutter delay period that commences on cutter activation, (ii) a first sensor that is downstream from said cutter and (iii) a second sensor that is downstream from said first sensor by a distance that is greater than the distance said strand travels during said cutter delay period and to (iv) a stick transporter that is downstream from said cutter and transports freshly cut stick resulting from cutting by said cutter away from that portion of said strand that follows said freshly cut stick;

(c) as said strand is passed by said first and second sensors, (A) counting and storing the count of a first amount of equally spaced time pulses, said first amount being defined as the amount of said equally spaced time pulses between (i) the time when a forward end of said strand is sensed by said first sensor and (ii) the time when said forward end is first sensed by said second sensor, then (B) signaling for said cutter activation at the end of a second amount of said equally spaced time pulses, said second amount being defined as the amount of said equally spaced time pulses between (i) the time when said first amount ends and (ii) the time when a third amount of said equally spaced time pulses ends where said third amount is defined as the number of said equally spaced time pulses in said first amount less the number of said equally spaced time pulses in said cutter delay period.

9. The method in accordance with claim 8, wherein said pneumatic conveyance from said die comprises an opened fluidized bed that passes air underneath said strand for lift and direction thereof to said cutter.

10. The method in accordance with claim 9, wherein said cutter comprises a blade mounted on a rotating shaft.

11. The method in accordance with claim 10, wherein said sensors are optic sensors.

12. The method in accordance with claim 11, wherein said transporter conveys said freshly cut sticks pneumatically in an open trough wherein air pressure provides direction and lift.

* * * * *

UNITED STATES PATENT AND TRADEMARK OFFICE
CERTIFICATE OF CORRECTION

PATENT NO. : 4,585,600
DATED : April 29, 1986
INVENTOR(S) : Richard A. Rollyson, Peter D. Wesson,
                  & Paul S. Zerwekh Case 1

It is certified that error appears in the above-identified patent and that said Letters Patent are hereby corrected as shown below:

Column 4, line 12, "diethgleneglycoldinitrate" should read
-- diethyleneglycoldinitrate --

Column 4, Line 36      "penpendicular"

Should Read      --perpendicular--

Column 6, Line 56      "penpendicular"

Should Read      --perpendicular--

Signed and Sealed this

Twelfth Day of August 1986

[SEAL]

Attest:

DONALD J. QUIGG

Attesting Officer      Commissioner of Patents and Trademarks